United States Patent
Manaugh et al.

(10) Patent No.: US 9,610,527 B2
(45) Date of Patent: Apr. 4, 2017

(54) FLUID FILTRATION SYSTEM

(71) Applicants: Thomas Scott Manaugh, Dallas, TX (US); Said Omar Majdi, Dallas, TX (US)

(72) Inventors: Thomas Scott Manaugh, Dallas, TX (US); Said Omar Majdi, Dallas, TX (US)

( * ) Notice: Subject to any disclaimer, the term of this patent is extended or adjusted under 35 U.S.C. 154(b) by 0 days.

(21) Appl. No.: 15/047,933

(22) Filed: Feb. 19, 2016

(65) Prior Publication Data
US 2016/0243468 A1    Aug. 25, 2016

Related U.S. Application Data

(60) Provisional application No. 62/176,533, filed on Feb. 23, 2015.

(51) Int. Cl.
*B01D 24/26* (2006.01)
*B01D 39/06* (2006.01)
(Continued)

(52) U.S. Cl.
CPC ....... *B01D 46/0082* (2013.01); *B01D 24/008* (2013.01); *B01D 24/12* (2013.01);
(Continued)

(58) Field of Classification Search
CPC .... B01D 24/16; B01D 24/165; B01D 24/167; B01D 24/186; B01D 24/4621; B01D 35/06; B01D 24/4673; B01D 39/06
See application file for complete search history.

(56) References Cited

U.S. PATENT DOCUMENTS

| | | | | |
|---|---|---|---|---|
| 1,872,759 A | * | 8/1932 | Laughlin | B01D 24/22 210/222 |
| 2,125,846 A | * | 8/1938 | Laughlin | B01D 21/0009 210/223 |

(Continued)

*Primary Examiner* — Matthew O Savage

(57) ABSTRACT

A fluid filtration system is disclosed herein. The filtration system includes a main tubular housing defining an interior chamber and having an outlet opening at a top end thereof and an inlet opening at a bottom thereof. A tubular inlet housing extends vertically into the interior chamber of the main housing through the inlet opening of the main housing. The tubular inlet housing has a hollow interior filled with shards of permanent magnets, a plurality of outlet portals located in the interior chamber proximate the bottom of the main housing, and an inlet opening at a bottom thereof. An inlet conduit is connected to the inlet opening of the tubular inlet housing. An adjustable fluid pump and can force the fluid from a supply of fluid to be filtered upwards through the inlet conduit at varying speeds. A permeable but compact horizontal layer of medium capable of trapping particulates is provided in the interior chamber of the main tubular housing adjacent the tubular inlet housing. The layer includes filtering particles that are attached to the magnets. Forces of magnetism produced by the shards of permanent magnets and gravity constrain the horizontal layer of filtering medium to maintain in place the layer of filtering particles. The adjustable fluid pump, an air pump connected to the inlet conduit, or electromagnets or vibrators mounted on an outer surface of the main housing can be used to disrupt the compactness of the layer of filtering particles to permit trapped particulates to be released and washed away from the layer of filtering particles.

6 Claims, 4 Drawing Sheets

Figure 3:
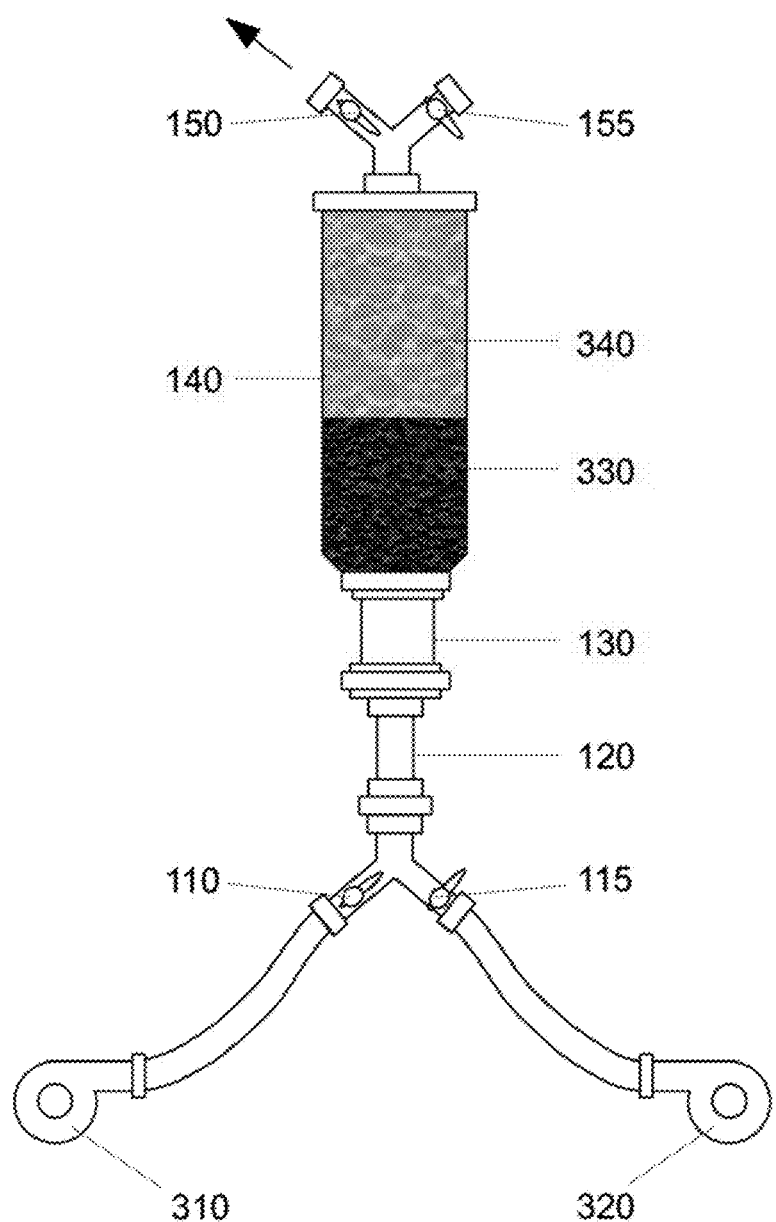

(51) Int. Cl.
  *B01D 46/00*    (2006.01)
  *B01D 24/46*    (2006.01)
  *B01D 24/16*    (2006.01)
  *B01D 35/06*    (2006.01)
  *B01D 24/00*    (2006.01)
  *B01D 24/12*    (2006.01)
  *B01D 24/30*    (2006.01)

(52) U.S. Cl.
  CPC ........... *B01D 24/16* (2013.01); *B01D 24/305* (2013.01); *B01D 24/4621* (2013.01); *B01D 24/4631* (2013.01); *B01D 24/4673* (2013.01); *B01D 35/06* (2013.01); *B01D 39/06* (2013.01)

(56) References Cited

U.S. PATENT DOCUMENTS

| | | | | | |
|---|---|---|---|---|---|
| 2,141,153 | A | * | 12/1938 | Laughlin ................ | B01D 24/22 210/222 |
| 3,713,543 | A | * | 1/1973 | Heaney ................ | B01D 21/00 210/196 |
| 3,841,486 | A | * | 10/1974 | Heitmann ............... | B01D 35/06 210/108 |
| 4,053,408 | A | * | 10/1977 | O'Cheskey .......... | B01D 24/008 210/786 |

* cited by examiner

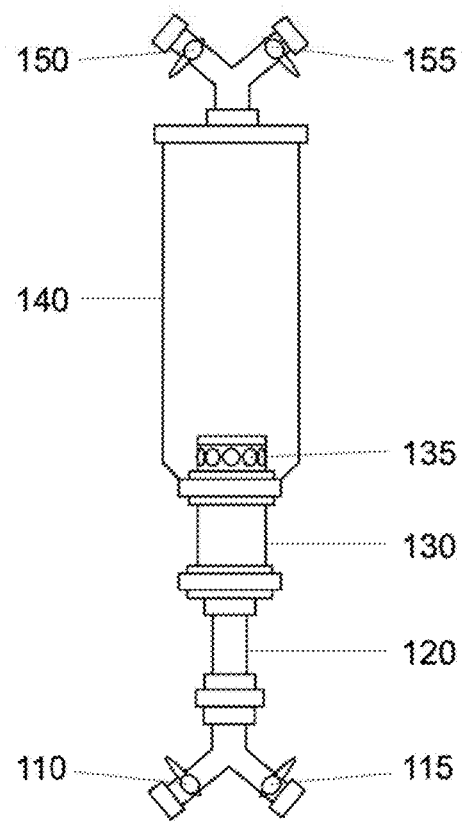
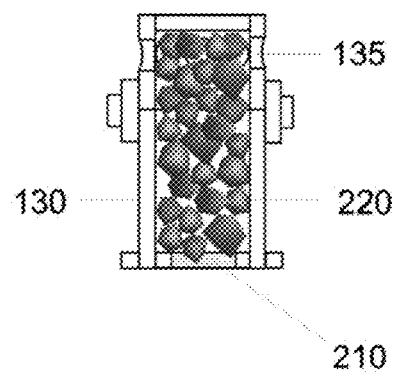
Fig. 1
Fig. 2

FLUID FILTRATION SYSTEM

CROSS-REFERENCE TO A RELATED APPLICATION

This utility application claims the benefit of U.S. Provisional Patent Application Ser. No. 62/176,533 filed Feb. 23, 2015, by Thomas Manaugh and Saïd Majdi, which is hereby incorporated by reference.

STATEMENT REGARDING FEDERALLY SPONSORED RESEARCH OR DEVELOPMENT

No federally sponsored research or development was used in the creation of this invention.

BACKGROUND OF THE INVENTION

Water, coming from a higher level than an artesian spring, can flow through a confined channel and travel upward into the spring as the water finds its own level. The upward-flowing water, if it passes through a layer of sand at the bottom of the spring, can be cleaned of solid particles by filtering action of the sand.

Later, a faster flow of water could serve to disturb the sand and cause it to release the solid particles that had been trapped in the sand—thus cleaning the filtering sand. The release of filtered particles could also result from other kinds of disruption to the compactness of the layer of sand, including (a) putting air bubbles in the water flowing upward through the sand, (b) moving the sand by mechanical stirring or vibration, and (c) shifting the sand about under the influence of a changing magnetic field in the case where the sand were a kind that could be attracted by a magnet.

The invention disclosed here mimics nature by creating a filter of sand that can trap small solid particles from an upward flowing stream of water. The continuously upward flowing water becomes "filtered water." It is directed to a location for storage or for immediate use at a location where filtered water is used.

After some period of filtering action in a constantly flowing stream of water, the sand can become clogged with small solid particles (here called "particulates"), thus losing its ability to filter water effectively. However, the sand can be cleaned by disturbing its compactness in a manner sufficient to release particulates that have been trapped in the sand. Those released particulates are carried away in the constantly flowing flow of water and are directed to a space designated for disposal.

The invention disclosed here mimics nature, but it also makes use of principles of physics, man-made equipment, and attraction of black sand (e.g., sand containing magnetite) to magnets. Those elements are combined in a novel way to allow a forward wash filter-cleaning cycle by simply flowing water through a layer of particulate-laden sand after the layer has been made less compact by being disrupted during the filter-cleaning cycle. Particulates are washed away in forward flowing particulate-laden water during the filter-cleaning cycle.

Both filtered water and particulate water flow forward. That feature leads to an especially easy and effective system and device for (a) producing filtered water and (b) cleaning, during a filter-cleaning cycle, the filter that cleans the water of particulates.

The invention described here is an improvement over conventional filtering devices because it allows an almost continuous production of filtered water (or other filtered fluid). The forward flowing water-filtering cycle can be interrupted only infrequently by a very simple filter-cleaning cycle. During the filter-cleaning cycle (a) water continues to flow forward through a disrupted layer of sand and (b) particulate-laden water is directed to a disposal space. The layer of sand is cleaned in a very simple and straightforward way.

Thus, Forward Wash Filter Cleaning (FWFC) means that water always flows forward through an FWFC-enabled filtering device, even during cleaning. No backwash is required.

BRIEF SUMMARY OF THE INVENTION

The invention mimics the filtering action performed by sand at the bottom of an artesian well, where particulates in constantly upward flowing water are trapped by the sand to produce naturally filtered water. Later, the sand, if disturbed, will release the trapped particulates into the upward flowing water, thereby naturally cleaning the sand that acted as a filter. Thus, the sand is cleaned by forward wash, which is different from the back wash procedure found in conventional, man-made filters.

The system of forward wash filter cleaning (FWFC) disclosed here mimics nature by using man-made equipment, principles of gravity and magnetism, and a filtering medium attracted by magnets (e.g., black sand). The filtering medium is constrained in a compact but permeable, horizontal filtering layer by gravity and magnetism. A fluid that contains suspended particulates flows upward through the filtering layer, leaving behind particulates that are trapped in the layer.

Later, during a filter-cleaning cycle, particulates are released when the compactness of the filtering layer is disturbed. The particulates are carried away to a disposal area by the still-upward-flowing fluid.

FWFC is efficient. Not using a conventional back wash procedure for cleaning a filter is advantageous because FWFC can be performed simply, quickly and completely, thus taking little time away from producing filtered fluid.

FWFC is economical. FWFC can save money when it is used to replace a system that demands frequent replacement of a filtering medium.

BRIEF DESCRIPTIONS OF THE DRAWINGS

In FIG. 1 a largely cylindrical-shaped embodiment of the invention is shown in a frontal view. Essential components are shown for conducting water upward through water-filtering cycles and forward-wash filter-cleaning cycles.

In FIG. 2 a part of same embodiment of the invention is again seen from the front, but in an enlarged and cross-sectional view. Here the inside of the an intake chamber is seen, containing chards of permanent magnets.

In FIG. 3 the embodiment of the invention is again seen in frontal view. Components have been added, including a water pump, an air pump, a layer of black sand seen through the transparent wall of the filtering chamber, and a volume of water above the sand and inside the chamber. The figure contains valves set in positions to allow to-be-filtered water to be pumped upward, through the black sand, and out of the filtering chamber. The air pump could be used to supply air for filtration or for disrupting the layer of black sand during a filter-cleaning cycle.

Figure 4:
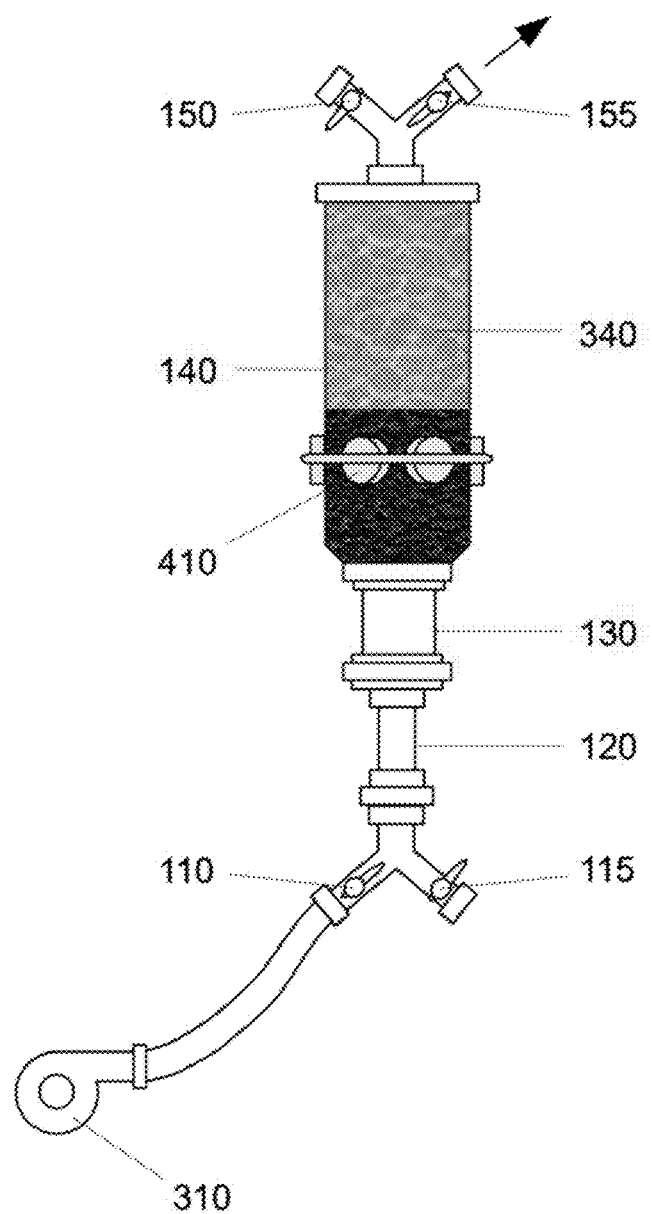

In FIG. 4 the embodiment of the invention is again seen in frontal view. Electromagnets are seen affixed to the outside wall of the filtering chamber and at the level of the black sand layer. A valve at the bottom is set to an open position, allowing water to be pumped up through the layer of black sand that has been disturbed by activating the electromagnets. An open valve at the top allows flow out of the filtering chamber of water and particulates that have been released from the sand. The same valve settings could be used if, during a filter-cleaning cycle, only faster flowing water were used to disrupt the black sand layer while the electromagnets were absent or were not activated.

Figure 5:
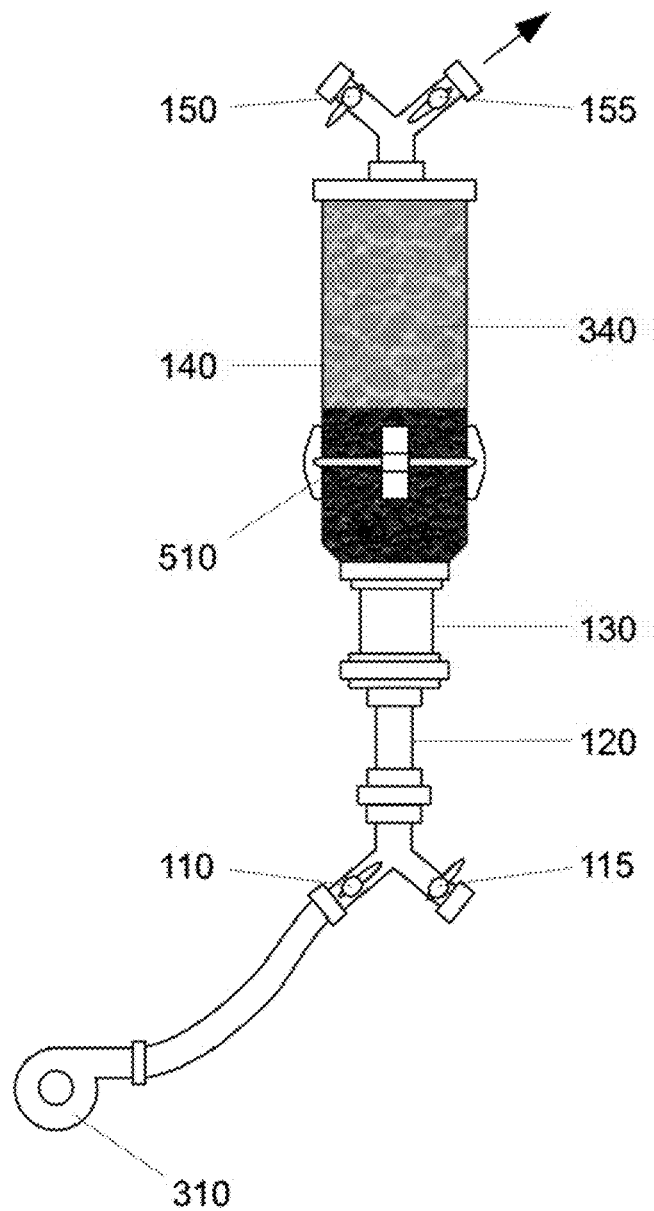

In FIG. 5 the embodiment of the invention is again seen in frontal view. Vibrators are seen affixed to the outside wall of the filtering chamber and at the level of the black sand layer. A valve at the bottom is set to an open position, allowing water to be pumped up through the layer of black sand that has been disturbed by activating the vibrators. An open valve at the top allows flow out of the filtering chamber of water and particulates that have been released from the sand.

DETAILED DESCRIPTION OF THE INVENTION

Forward Wash Filter Cleaning (FWFC) is a system and apparatus for allowing easy and inexpensive cleaning of a filtering medium. FWFC can be used in numerous applications wherein a filtering medium is used to remove particulates from a fluid and the filtering medium later needs to be cleaned.

Basic components of a water-filtering apparatus that employs FWFC are illustrated by an embodiment depicted in FIGS. 1 and 2.

During a water-filtering cycle in the apparatus shown in FIGS. 1 and 2, a flow of water from below would pass upward through the following components:

(1) an open water-intake valve [110] while bypassing a closed air-intake valve [115]
(2) an intake pipe [120]
(3) an intake chamber [130] containing a threaded aperture [210] at its bottom that attaches to the intake pipe [120] and a matrix comprising a plurality of small chards of permanent magnets [220]
(4) at least one portal hole [135] through the vertical wall of the cylindrically shaped intake chamber
(5) a transparent filtering chamber [140] (though it need not be transparent) containing black sand (not shown)
(6) an open filtered-water exit valve [150], while bypassing a closed particulate-water exit valve [155]

After passing through the exit valve [150], filtered water is directed toward a space where it can be used or stored (not shown).

In FIG. 3 a water pump [310] is shown. The pump supplies water pressure that forces an upward flow of water through the filter.

Water pressure from below could also come from water finding its own level if water were to flow upward through a water-immersed device, where water was continuously removed by pumping from the top of the filter. In that alternative embodiment (not shown), continuous forward flow of water upward would be effected by gravity causing water inside the apparatus to seek the level of the immersing body of water.

Also shown in FIG. 3 is a layer of black sand [330] that would trap particulates during a water-filtering cycle, thereby producing filtered water [340]. A continuous pumping of water up through the filter would produce a continuous flow of filtered water that would exit through a valve [150].

However, pumping the water at higher speed and pressure would disrupt the layer of black sand [330] inside the filtering chamber [140], thereby releasing particulates that had been trapped during the water-filtering cycle. Releasing trapped particulates and washing them away in forward flowing water is the essence of FWFC. The desired higher speed flow of water would create observable disruption of black sand on the surface of the layer of black sand [330]. Minimal experimentation would be needed to set the speed high enough that disruption of the black sand would be observed. During the filter-cleaning cycle the particulate-water produced would exit through an open particulate-water exit valve [155] while the filtered-water exit valve [150] would be closed.

Air bubbles flowing upward through the filtering medium of black sand can also disrupt the compactness of the layer of sand and, thereby, enhance the speed and completeness of FWFC. Shown in FIG. 3 is an air pump [320] that could be activated to inject air through an open air valve [115] and into the
water forced to flow upward into the filter by the water pump [310]. Upward moving air bubbles would flow through the layer of black sand [330], thereby disrupting the compactness of the sand and effecting a quicker and more complete release of particulates during a filter-cleaning cycle.

Electrifying electromagnets in the vicinity of the layer of black sand would cause movement of the black sand, thereby disrupting the compactness of the layer of black sand and allowing release of previously trapped particulates. Shown in FIG. 4 is a ring of electromagnets [410] affixed to the outside of the filtering chamber [140] (though they could alternatively be embedded in the black sand inside the chamber). When electrically activated together or in a pattern of some being off and some on during a filter-cleaning cycle, the magnets would cause black sand to shift toward activated magnets, thus disrupting compactness of the black sand layer [330] and allowing previously trapped particulates to be released and carried away in forward flowing water. Thus, use of the electromagnets would effect quicker and more complete release of particulates during a filter-cleaning cycle. Only minimal experimentation would be needed to determined patterns and levels of electrical activation needed for the electromagnets to disrupt the layer of black sand.

Applying mechanical force to the black sand in the black sand layer can cause movement in the black sand and disrupt the layer, thereby allowing release of previously trapped particulates to be washed away in forward flowing water. Shown in FIG. 5 is a ring of vibrators [510] affixed to the outside of the filtering chamber [140] (though they could be inside). When electrically activated, the vibrators would cause shifting of black sand [330] inside the filtering chamber because of mechanical force on the sand indirectly from the vibration of the chamber wall or directly on the sand when the vibrators are embedded in the sand—a kind of mechanical stirring of the sand to disrupt the compactness of the layer of sand. Said stirring would effect quicker and more complete release of trapped particulates that would be washed away during a filter-cleaning cycle. The above described embodiment of a FWFC-enabled filtering device can be used to filter air (or other gas) as well as a liquid like water. In the case of air filtering, the air pump [320] shown in FIG. 3 would operate continually during both air-filtering and filter-cleaning cycles. The water pump [310] would be activated during a filter-cleaning cycle. The water pump could also operate at a reduced speed during air-filtering to moisten the black sand [330] to thereby (a) enhance trapping of certain air pollutants like pollen, dust, or soot and (b) humidify air passing through the filter. During an air-filtering cycle, filtered air would exit through an open exit valve [150] while the other exit valve [155] stayed closed. During a filter-cleaning cycle, previously trapped particulates would be washed away by air and water, through exit valve [155] while the other exit valve [150] would stay closed.

In summary, FWFC can be easily effected by simply increasing the flow of water during a filter-cleaning cycle. Cleaning can be effected more quickly and more completely by applying one or more means (possibly in combination) to disrupt a layer of black sand during a filter-cleaning cycle. Various other means for improved filtering of water, filtering of air, or filter cleaning would be found by one skilled in the art who would apply the teachings recited here.

In order to affix a vibrator [510], an electromagnet [410], or other equipment to the filtering chamber [140], as specified above, various reliable means could be used, comprising gluing, bolting, welding, and strapping.

The embodiment disclosed above is but one embodiment of our invention that uses black sand, gravity, water pressure, mechanical force, and magnetism in novel ways to remove particulates from a filtering medium. One skilled in the art can easily envision many embodiments where variations on the invention would be widely useful for filter cleaning. For example, steel shot could replace black sand in some variations; and though the embodiment described above is largely cylindrical in shape, other embodiments could have shapes other than cylindrical. That and many other variations are covered by claims that are made here for the FWFC invention.

What is claimed is:

1. A fluid filtration system, comprising:
   a main tubular housing defining an interior chamber and having an outlet opening at a top end thereof and an inlet opening at a bottom thereof;
   a tubular inlet housing extending vertically into the interior chamber of the main tubular housing through the inlet opening of the main tubular housing, the tubular inlet housing having a hollow interior filled with shards of permanent magnets, the tubular inlet housing having a plurality of outlet portals located in the interior chamber proximate the bottom of the main tubular housing, the tubular inlet housing having an inlet opening at a bottom thereof;
   an inlet conduit connected to the inlet opening of the tubular inlet housing;
   a supply of the fluid to be filtered;
   an adjustable fluid pump having an inlet and an outlet, wherein the inlet of the adjustable fluid pump is connected to the supply of the fluid to be filtered, wherein the outlet of the adjustable fluid pump is connected to the inlet conduit and can force the fluid upwards through the inlet conduit at varying speeds;
   an outlet conduit connected to the outlet opening of the main housing;
   wherein the inlet conduit directs an upward flow of fluid to be filtered into the inlet opening of the tubular inlet housing, to produce a permeating upward flow of fluid in the interior chamber of the main tubular housing;
   a permeable but compact horizontal layer of filtering medium capable of trapping particulates located in the interior chamber of the main tubular housing adjacent to the tubular inlet housing, the layer comprising filtering particles that are attracted to the shards of permanent magnets located in tubular inlet housing;
   wherein forces of magnetism produced by the shards of permanent magnets and gravity constrain the horizontal layer of filtering medium to maintain the layer of filtering particles in place; and
   means for disrupting the compactness of the filtering layer, whereby trapped particulates are released and washed away from the layer of filtering medium by the permeating upward flow of fluid.

2. The fluid filtration system according to claim 1, wherein the layer of filtering particles comprises magnetite.

3. The fluid filtration system according to claim 1, wherein the means of disrupting the compactness of the layer of filtering medium comprises said adjustable fluid pump, wherein the fluid pump is adjusted to increase a flow rate of the fluid to be filtered to disrupt the layer of filtering medium attracted to the magnets and to thereby release the particulates trapped therein.

4. The fluid filtration system according to claim 1, wherein the means of disrupting the compactness of the layer of filtering medium comprises an air pump that is connected to the inlet conduit and is adapted to release a stream of air into the upward flow of the fluid to be filtered, whereby the compactness of the layer of particles attracted to magnets is disrupted by the stream of air and particulates trapped therein are released and washed away.

5. The fluid filtration system according to claim 1, wherein the means of disrupting the compactness of the layer of filtering medium comprises electromagnets on an outer surface of the main housing, wherein movement in the filtering medium is provided when the electromagnets are electrified in the vicinity of the layer of particles attracted to magnets, whereby the compactness of the layer of particles attracted to magnets is disrupted and particulates trapped therein are released and washed away.

6. The fluid filtration system according to claim 1, further wherein the means of disruption of the compactness of the layer of filter media comprises a vibrator mounted on an outer surface of the main housing, wherein a mechanical force is applied to the layer of filtering medium by energizing said vibrator, whereby the compactness of the layer of particles attracted to magnets is disrupted and particulates trapped therein are released and washed away.

* * * * *